United States Patent
Yuan

(10) Patent No.: US 11,473,654 B2
(45) Date of Patent: Oct. 18, 2022

(54) RECIPROCATING ENGINE WITH EXTENDED MINIMUM COMBUSTION CHAMBER VOLUME

(71) Applicant: Defang Yuan, Ottawa (CA)

(72) Inventor: Defang Yuan, Ottawa (CA)

( * ) Notice: Subject to any disclaimer, the term of this patent is extended or adjusted under 35 U.S.C. 154(b) by 0 days.

(21) Appl. No.: 17/157,890

(22) Filed: Jan. 25, 2021

(65) Prior Publication Data

US 2022/0235854 A1  Jul. 28, 2022

(51) Int. Cl.
*F16H 21/36* (2006.01)
*F02P 5/04* (2006.01)
*F16H 1/28* (2006.01)

(52) U.S. Cl.
CPC ............. *F16H 21/365* (2013.01); *F02P 5/04* (2013.01); *F16H 1/2845* (2013.01); *F16H 2001/2872* (2013.01); *F16H 2001/2881* (2013.01)

(58) Field of Classification Search
CPC .............. F16H 21/365; F16H 1/2845; F16H 2001/2872; F16H 2001/2881; F02P 5/04
USPC .................................. 123/197, 400
See application file for complete search history.

(56) References Cited

U.S. PATENT DOCUMENTS

| | | | |
|---|---|---|---|
| 9,556,832 B1 * | 1/2017 | Sergin | F02D 41/3827 |
| 10,927,755 B1 * | 2/2021 | Pompeu | F02B 75/32 |
| 2007/0227503 A1 * | 10/2007 | Hitomi | F02P 5/151 |
| | | | 123/316 |
| 2011/0230303 A1 * | 9/2011 | Yorukoglu | F16H 21/20 |
| | | | 475/331 |
| 2015/0247452 A1 * | 9/2015 | Haynes | F01B 9/042 |
| | | | 475/331 |
| 2015/0267630 A1 * | 9/2015 | Magnusson | F02M 26/21 |
| | | | 123/568.19 |
| 2017/0159560 A1 * | 6/2017 | Fluhler | F01B 9/042 |

* cited by examiner

*Primary Examiner* — Yi-Kai Wang

(57) ABSTRACT

A crankshaft system is provided. The crankshaft has a main journal, a rod journal rotates around the main journal, a planet gear is attached to the rod journal and can rotate around the rod journal, the rotation of the planet gear is constrained by a constraining gear, the teeth number of the constraining gear is integer k times of the teeth number of the planet gear, a crankpin is mounted on the planet gear, one end of a connecting rod of a piston is attached to the crankpin, the constraining gear is a ring gear or a sun gear, the trajectory of the crankpin is noncircular. The combustion chamber volume keeps constant from 0° ATDC to 14° ATDC, or the minimum combustion chamber volume extends from TDC to 14° ATDC or after 14° ATDC.

18 Claims, 9 Drawing Sheets

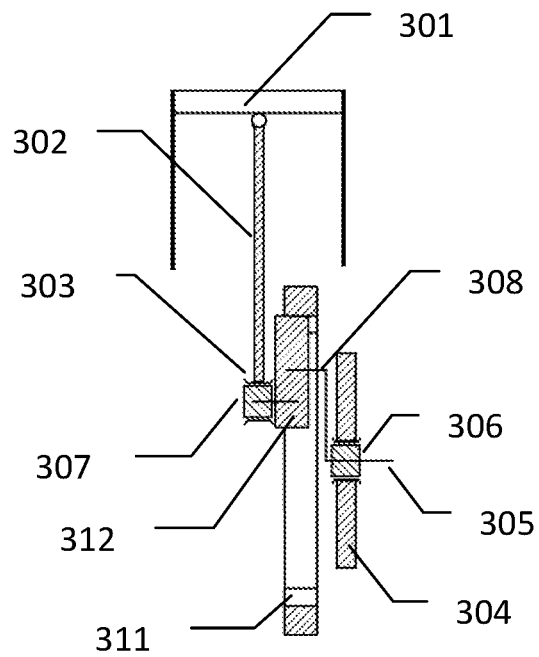
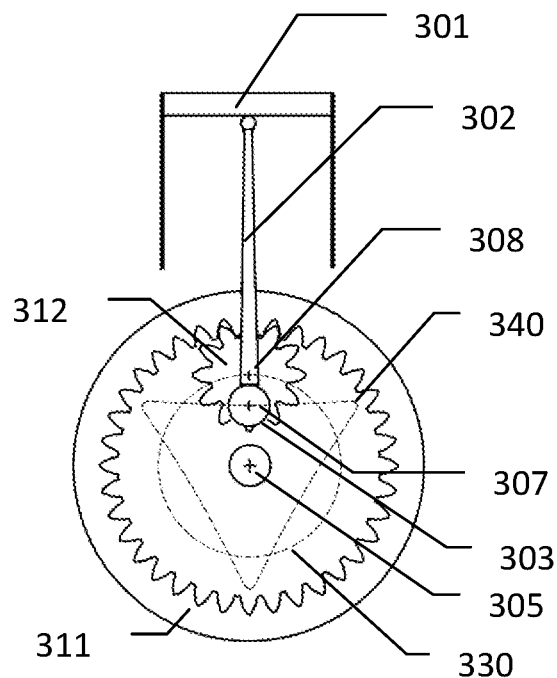
FIG. 3  FIG. 4
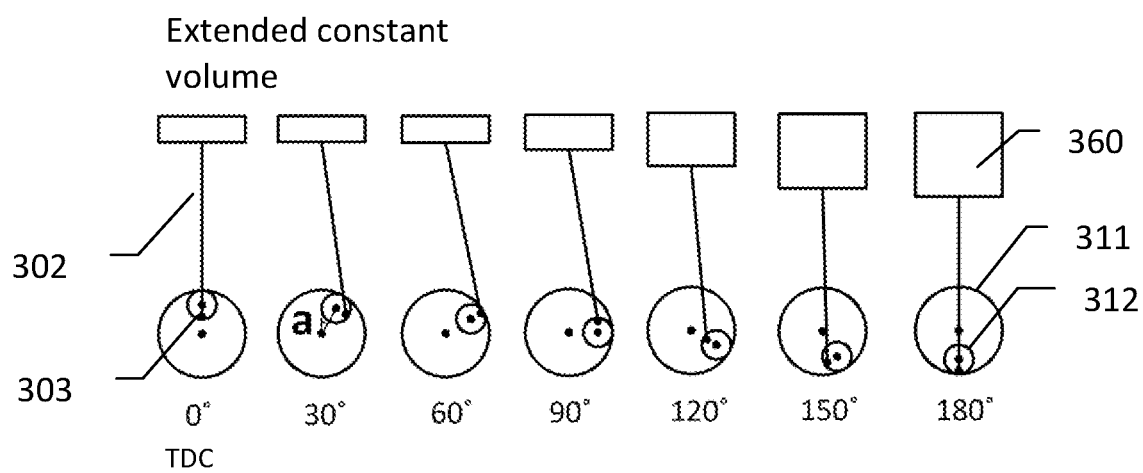
FIG. 5

| Gears | Sizes | Crankpin Trajectories |
|---|---|---|
| 820 ⟍ Ring gear + Planet gear | k=3<br>L=4<br>r=0.667<br>mc=0.257<br>Ax>40° | 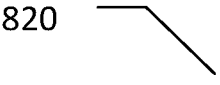 |
| | k=4<br>L=4<br>r=0.750<br>mc=0.125<br>Ax>22° | 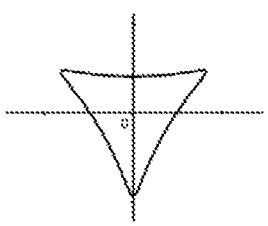 |
| | k=5<br>L=4<br>r=0.8<br>mc=0.07<br>Ax>15° | 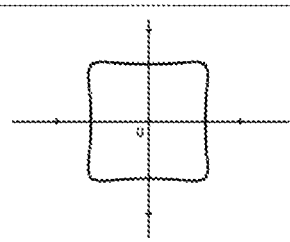 |
| 821 ⟍ Sun gear + Planet gear | k=1<br>L=4<br>r=2<br>mc=0.58<br>Ax>25° | 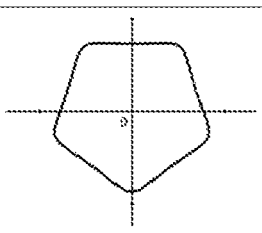 |
| | k=2<br>L=4<br>r=1.5<br>mc=0.20<br>Ax>18° |  |
| | k=3<br>L=4<br>r=1.33<br>mc=0.10<br>Ax>14° | 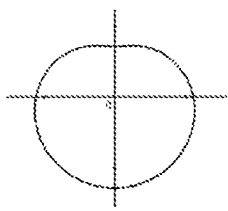 |
FIG. 12

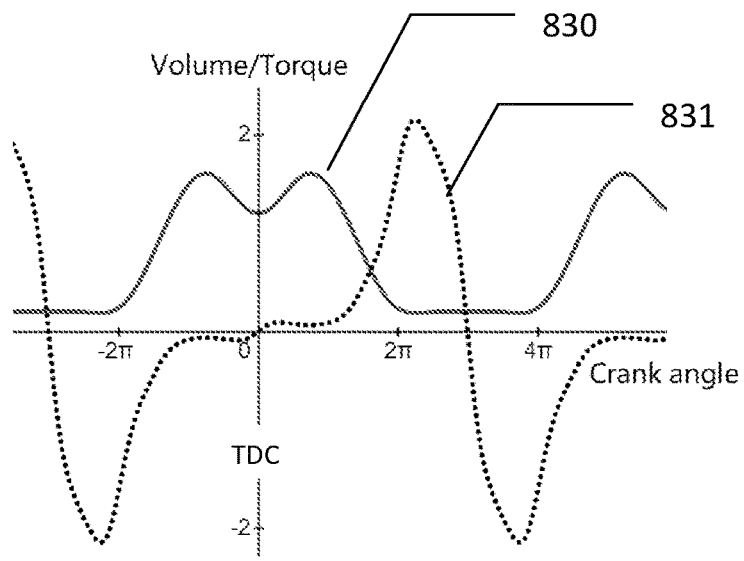

FIG. 12A

890 Ring gear + planet gear $$q = \sqrt{m^2 + r^2 - 2 \cdot m \cdot r \cdot \cos(k\,a)}$$

$$a_1 = \sin^{-1}\left(\frac{m}{q}\sin(k\,a)\right) + a$$

$$V = L + r - m + Vc - \left(L\cos\left(\sin^{-1}\left(\frac{q}{L}\sin(a_1)\right)\right) + q\cos(a_1)\right)$$

891 Sun gear + planet gear $$q = \sqrt{m^2 + r^2 - 2 \cdot m \cdot r \cdot \cos(k\,a)}$$

$$a_1 = -\sin^{-1}\left(\frac{m}{q}\sin(k\,a)\right) + a$$

$$V = L + r - m + Vc - \left(L\cos\left(\sin^{-1}\left(\frac{q}{L}\sin(a_1)\right)\right) + q\cos(a_1)\right)$$

FIG. 13

| Ring gear constraint (Vc=0.2) ||||
|---|---|---|---|
| k=3<br>V=Vc +/- 0.1%Vd<br>L=4<br>m=0.260<br>Ax=43.1 | k=3<br>V=Vc +/- 0.1%Vd<br>L=3.3<br>m=0.282<br>Ax=47.8 | k=3<br>V=Vc +/- 0.1%Vd<br>L=3.0<br>m=0.296<br>Ax=53.5 | k=3<br>V=Vc +/- 0.1%Vd<br>L=2.7<br>m=0.312<br>Ax=59.6 |
| k=4<br>V=Vc +/- 0.1%Vd<br>L=4<br>m=0.126<br>Ax=25.7 | k=4<br>V=Vc +/- 0.1%Vd<br>L=3.3<br>m=0.135<br>Ax=26.3 | k=4<br>V=Vc +/- 0.1%Vd<br>L=3.0<br>m=0.141<br>Ax=27.1 | k=4<br>V=Vc +/- 0.1%Vd<br>L=2.7<br>m=0.148<br>Ax=27.6 |
| k=5<br>V=Vc +/- 0.1%Vd<br>L=4<br>m=0.076<br>Ax=21.3 | k=5<br>V=Vc +/- 0.1%Vd<br>L=3.3<br>m=0.081<br>Ax=21.7 | k=5<br>V=Vc +/- 0.1%Vd<br>L=3.0<br>m=0.084<br>Ax=22.0 | k=5<br>V=Vc +/- 0.1%Vd<br>L=2.7<br>m=0.088<br>Ax=22.5 |
| Sun gear constraint (Vc=0.2) ||||
| k=1<br>V=Vc +/- 0.1%Vd<br>L=5<br>m=0.571<br>Ax=28.0 | k=1<br>V=Vc +/- 0.1%Vd<br>L=4.4<br>m=0.575<br>Ax=27.5 | k=1<br>V=Vc +/- 0.1%Vd<br>L=4<br>m=0.578<br>Ax=27.1 | k=1<br>V=Vc +/- 0.1%Vd<br>L=3<br>m=0.590<br>Ax=26.1 |
| k=2<br>V=Vc +/- 0.1%Vd<br>L=5<br>m=0.202<br>Ax=21.5 | k=2<br>V=Vc +/- 0.1%Vd<br>L=4.4<br>m=0.203<br>Ax=20.7 | k=2<br>V=Vc +/- 0.1%Vd<br>L=4<br>m=0.204<br>Ax=20.1 | k=2<br>V=Vc +/- 0.1%Vd<br>L=3<br>m=0.209<br>Ax=18.9 |
| k=3<br>V=Vc +/- 0.1%Vd<br>L=5<br>m=0.106<br>Ax=18.7 | k=3<br>V=Vc +/- 0.1%Vd<br>L=4.4<br>m=0.107<br>Ax=18.3 | k=3<br>V=Vc +/- 0.1%Vd<br>L=4<br>m=0.108<br>Ax=18.1 | k=3<br>V=Vc +/- Vd*0.1%<br>L=3<br>m=0.111<br>Ax=17.2 |

FIG. 14

RECIPROCATING ENGINE WITH EXTENDED MINIMUM COMBUSTION CHAMBER VOLUME

FIELD OF THE INVENTION

The present disclosure relates to crankshaft of piston engine. More specifically, the present disclosure relates to a novel crankshaft system which has a noncircular crankpin trajectory in rotation. The combustion chamber volume is specifically constrained to keep constant from 0° ATDC to 14° ATDC or beyond, and output torque is increased and fuel efficiency is improved.

BACKGROUND OF THE INVENTION

There are certain disadvantages relating to the existing prior art crankshaft of piston engines:
1) The trajectory of rod journal is circular, in other words, the big end of the rod journal is rotating around the main journal in a circular trajectory. This configuration of crankshaft makes the minimum combustion volume located at TDC position, and the output torque on crankshaft is very low when peak combustion is located at positions near TDC;
2) The ignition is advanced of TDC position. The peak combustion pressure is obtained only when the combustion chamber volume is at its minimum, an advanced ignition makes very low combustion pressure because the peak combustion chamber volume is far away from the minimum combustion volume at low speed;
3) Some cycloid, trochoid, hypocycloid or epicycloids mechanisms are introduced to modify the combustion chamber volume, but none of the prior arts disclosures that the best output torque can be obtained only when the combustion chamber volume keep constant from 0° TDC to 14° ATDC or to a bigger crank angles, or the minimum combustion chamber volume is extended to 14° ATDC or beyond.

Therefore, there remains a need for a novel crankshaft system, which extends minimum combustion chamber volume from TDC to a bigger crank angle x° ATDC, or moves the position of minimum combustion chamber volume from TDC position to a bigger crank angle, and at same time keeps the volume constant within these angles, and retarded ignition is introduced so that both the output torque on crankshaft and fuel efficiency are improved.

In U.S. Pat. Nos. 10,316,744B2, 9,574,502B1 and 8,578, 695B1 by Herbert U. Fluhler, some configurations of crankshaft and piston rod connections are presented. Some types of cycloid/trochoid/hypocycloid/epicycloids are described in the patents. Herbert U. Fluhler focuses on making the expansion volume (or combustion stroke) bigger or longer than compression volume (or compression stroke) to increases fuel efficiency. These configurations have similar combustion chamber volume profiles near TDC. That is, the minimum combustion chamber volumes are located at the TDC position; the combustion chamber volumes are not constant from 0° TDC to x° ATDC, for example, not constant from 0° TDC to 14° ATDC.

In U.S. Pat. No. 6,510,831B2 by Randall Wiseman, a hypocycloid gear assembly is introduced to make piston rod moves linearly. In this patent the minimum combustion chamber volume is located at the TDC position of the piston. The combustion chamber volume is not constant from 0° TDC to x° ATDC, for example, not constant from 0° TDC to 14° ATDC.

In U.S. Pat. No. 10,830,127B2 by Ford Global, an eccentrically configured mechanism is provided to modify the combustion chamber and crank angle relations. The combustion chamber volume is not constant from 0° TDC to x° ATDC, for example, the volume increases rapidly from 0° TDC to 14° ATDC, the minimum combustion chamber volume is still located at the TDC position.

In U.S. Pat. No. 5,465,648 by Chiou C., another gear mechanism is described to modify the combustion volume and crank angle relations. The minimum combustion chamber volume is located at the TDC position; the combustion chamber volume is not constant from 0° TDC to x° ATDC, for example, the volume increases a lot from 0° TDC to 14° ATDC.

In U.S. Pat. No. 4,073,196 by Basil Dell, another gear mechanism is described to modify the combustion chamber and crank angle relations. The minimum combustion chamber volume is located at the TDC position, and the combustion chamber volume is not constant from 0° TDC to x° ATDC, for example, the volume increases a lot from 0° TDC to 14° ATDC.

A 4/3 gear ratio hypocycloid "square engine" mechanism is presented by Andre at www.andredavidbrown.com/post/hypocycloid-square-engine. The combustion chamber volume is nearly constant from 0° TDC to 40° ATDC. But detailed simulations show that this engine never generates positive torques in expansion stroke at 4/3 gear ratio. Because not all extended minimum combustion chamber volume generates positive torque in expansion stroke at a given gear ratio, more constraints must be taken into consideration to make the system beneficial in improving torque in applications.

Prior arts of cycloid, trochoid, hypocycloid or epicycloids gear mechanisms do not disclose the detailed relations between the combustion chamber volume profiles and gear ratio/parameter settings and crank angles. In the disclosure of the present invention, combustion chamber volume relations with pin arm length and gear ratio are presented. An increased effective torque and a constant combustion chamber volume can be obtained only when the gear ratio is an integer and the crankpin arm length is smaller than the equivalent radius of the planet gear. When the crankpin arm length is bigger than the equivalent radius of the planet gear, excessive pumping losses or piston wears will occur because the piston moves up and down more than two times near minimum volume position(s) in a complete working circle.

SUMMARY OF THE INVENTION

The present invention aims to achieve a novel crankshaft system:
1) The big end of the connecting rod is rotating around the main journal in a noncircular trajectory, the position of minimum combustion chamber volume is extended to a bigger crank angle such as >14° ATDC, or shifted farther away from TDC and kept the volume constant, then the torque on crankshaft can be much higher than prior art piston engine at same fuel consumption;
2) Both advanced and retarded ignitions are available in the engine with the novel crankshaft system.

According to one aspect of the invention there is provided a crankshaft system of piston engine, comprising:
a main journal,
a rod journal, a ring gear with a equivalent radius Rr and a total of Zr teeth,
a planet gear with a equivalent radius Rp and a total of Zp teeth,
a crankpin,
a connecting rod,
wherein the rod journal rotates around the main journal, the distance between the rod journal center and the main journal center is r, the planet gear rotates around the rod journal and the rotation of the planet gear is inside of the ring gear and is constrained by the ring gear, the crankpin is mounted on the planet gear, the distance between the planet gear center and the crankpin center is m, the length of the connecting rod is L, a first end of the connecting rod is attached to the crankpin, a second end of the connecting is attached to a piston,
wherein the main journal is fixed on a crankcase by a bearing and the main journal rotates in the bearing around its axle,
wherein the ring gear is stationary with reference to the crankcase,
wherein $0<m<r<L$, $m<Rp$, $k=Zr/Zp=Rr/Rp$, k is integer, Zr and Zp are integers,
wherein when the piston is at its TDC position, all 4 restrictions are applied at same time:
  Restriction 1, crank angle=0;
  Restriction 2, the center of planet gear, the center of the ring gear and the center of the crankpin are aligned with the connecting rod;
  Restriction 3, the rod journal is at its uppermost position;
  Restriction 4, the center of the crankpin is at the lower side of the planet gear center,
wherein the piston and a cylinder define a combustion chamber volume, the maximum combustion chamber volume defines a displacement of the piston, the combustion chamber volume when the piston is at its TDC position defines a minimum volume. The variation of the minimum volume is within 0.2% of the displacement of the piston from 0° ATDC to Ax=15° ATDC and beyond.

According to another aspect of the invention there is provided a crankshaft system of piston engine, comprising:
a main journal,
a rod journal,
a sun gear with a equivalent radius Rs and a total of Zs teeth,
a planet gear with a equivalent radius Rp and a total of Zp teeth,
a crankpin,
a connecting rod,
wherein the rod journal rotates around the main journal, the distance between the rod journal center and the main journal center is r, the planet gear rotates around the rod journal and the rotation of the planet gear is outside of the sun gear and is constrained by the sun gear, the crankpin is mounted on the planet gear, the distance between the planet gear center and the crankpin center is m, the length of the connecting rod is L, a first end of the connecting rod is attached to the crankpin, a second end of the connecting is attached to a piston,
wherein the main journal is fixed on a crankcase by a bearing and the main journal rotates in the bearing around its axle,
wherein the sun gear is stationary with reference to the crankcase,
wherein $0<m<r<L$, $m<Rp$, $k=Zs/Zp=Rs/Rp$, k is integer, Zs and Zp are integers,
wherein when the piston is at its TDC position, all 4 restrictions are applied at same time:
  Restriction 1, crank angle=0;
  Restriction 2, the center of planet gear, the center of the sun gear and the center of the crankpin are aligned with the connecting rod;
  Restriction 3, the rod journal is at its uppermost position;
  Restriction 4, the center of the crankpin is at the lower side of the planet gear center,
wherein the piston and a cylinder define a combustion chamber volume, the maximum combustion chamber volume defines a displacement of the piston, the combustion chamber volume when the piston is at its TDC position defines a minimum volume. The variation of the minimum volume is within 0.2% of the displacement of the piston from 0° ATDC to Ax=14° ATDC and beyond.

A method of extending the minimum combustion chamber volume of a piston engine, comprising:
a main journal,
a rod journal,
a constraining gear,
a planet gear,
a crankpin,
a connecting rod,
wherein the rod journal rotates around the main journal, the distance between the rod journal center and the main journal center is r, the planet gear rotates around the rod journal, the rotation of the planet gear is constrained by the constraining gear, the crankpin is mounted on the planet gear, the distance between the planet gear center and the crankpin center is m, the length of the connecting rod is L, a first end of the connecting rod is attached to the crankpin, a second end of the connecting is attached to a piston,
wherein the main journal is fixed on a crankcase by a bearing and the main journal rotates in the bearing around its axle,
wherein the constraining gear is stationary with reference to the crankcase,
wherein the piston and a cylinder define a combustion chamber volume, the maximum combustion chamber volume defines a displacement, the combustion chamber volume when the piston is at its TDC position defines a minimum volume,
wherein the number of teeth of the constraining gear is integer k times of the number of teeth of the planet gear,
wherein $0<m<r<L$,
wherein when the piston is at its TDC position, all 4 restrictions are applied at same time:
  Restriction 1, crank angle=0;
  Restriction 2, the center of planet gear, the center of the constraining gear and the center of the crankpin are aligned with the connecting rod;
  Restriction 3, the rod journal is at its uppermost position;
  Restriction 4, the center of the crankpin is at the lower side of the planet gear center, wherein when the main journal rotates, the crankpin rotates around both the main journal and the planet gear center simultaneously but in different angular velocities, the trajectory of the crankpin is noncircular, the movement the first end of the connecting rod follows the trajectory of the crankpin. The variation of the minimum volume is within 0.2% of the displacement of the piston from 0° ATDC to Ax=14° ATDC and beyond, the minimum volume extend from TDC to Ax and beyond. Wherein the constraining gear is a ring gear, the planet gear rotates inside of the ring gear, the mathematical relations of the extended minimum volume follows the expressions:

$$V=(L+r+Vc-m)-(L*\cos(\arcsin(q/L*\sin(a1)))+q*\cos(a1)),$$

where in $a1=a+\arcsin(m/q*\sin(k*a))$, wherein q=square root (square(m)+square(r)−2*m*r*cos(k*a)),
wherein a is the crank angle of the crankshaft,
wherein Vc is the clearance volume at TDC position,
There is a critical m=mc at each given set of L. r, k and Vc under the restrictions, a specific Ax can be obtained, where the variation of the combustion chamber volume V keeps within 0.2% of the displacement of the piston from 0° ATDC to Ax° ATDC, wherein Ax>15.
Wherein the constraining gear is a sun gear, the planet gear rotates outside of the sun gear, the mathematical relations of the extended minimum volume follows the expressions:

$$V=(L+r+Vc-m)-(L*\cos(\arcsin(q/L*\sin(a1)))+q*\cos(a1)),$$

where in a1=a+arcsin(m/q*sin(k*a)),
wherein q=square root (square(m)+square(r)−2*m*r*cos(k*a)),
wherein a is the crank angle of the crankshaft,
wherein Vc is the clearance volume at TDC position,
There is a critical m=mc at each given set of L. r, k an Vc under the restrictions, a specific Ax can be obtained, where the variation of the combustion chamber volume V keeps within 0.2% of the displacement of the piston from 0° ATDC to Ax° ATDC, wherein Ax>14.

BRIEF DESCRIPTION OF THE DRAWINGS

By way of example only, preferred embodiments of the present invention are described hereinafter with reference to the accompanying drawings, wherein:

FIG. 3 is a side section illustration of an embodiment of crankshaft and piston in the present invention with a ring gear;

FIG. 4 is a front view illustration of an embodiment of crankshaft and piston in the present invention with a ring gear;

FIG. 5 is an illustration of piston positions, combustion chamber volumes and crank angles in the present invention with a ring gear;

FIG. 12 is a list of some different configurations of the embodiments in the present invention which generates preferable crankshaft torques;

FIG. 12A is the torque-combustion chamber volume relation in Andre's square engine wherein k=4/3, which does not generates positive crankshaft torques;

FIG. 13 a list of the formulas and relations of V, L, r, m, a, a1 and q of the embodiments in the present invention;

FIG. 14 is a list of some k, l, m and Ax relations when combustion volumes V are kept within 0.2% of Vd;

DETAILED DESCRIPTION OF THE INVENTION

Figure 1:
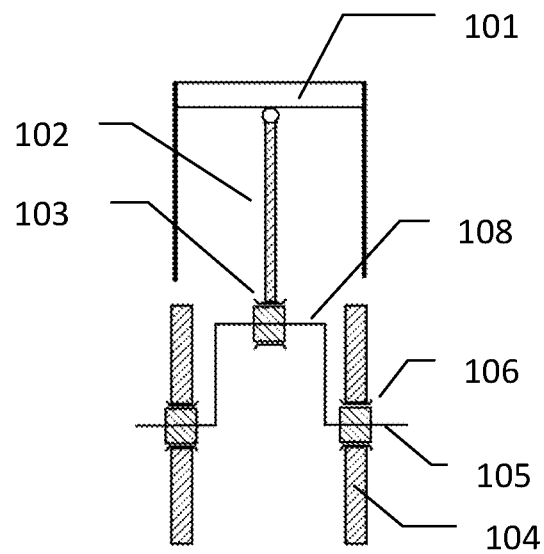
FIG. 1 is an illustration of a prior art traditional crankshaft.

It is to be understood that the disclosure is not limited in its applications to the details of the embodiments as set forth in the following description. The invention is capable of other embodiments and of being practiced or of being carried out in various ways. Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

Graphics are used in order to simplify the descriptions. Most of the sizes or the parameters in the graphics are scaled for ease of understanding, or are normalized at given conditions. The graphics show a mutual contrast relationship instead of the actual sizes or values. The crank angle a in the graph is the actual value of crankshaft. The crank angle is expressed in both degrees and radians, the clockwise rotation is defined as the reference direction.

The directions and positions used in the description, such as up, down, vertically, horizontally, left, and right, are based on the relative directions and relative positions shown in the Figures, and are not necessarily the directions and positions in actual real-life applications.

The terms "rotation" and "revolution" are used to describe angular movement or angular position, a crank angle is generally used to describe these movement related to the crankshaft, a quasi-crank-angle a1 is used to describe the rotational movement of the quasi-arm q. The clockwise rotation is defined as the reference direction.

The term "position" used in the description may refer to the physical position or the crank angle position. The abscissa (x-axis) of the variable is identified by the crank angle of crankshaft. In the description, cylinder and crankcase keep at reference stationary positions, the ring gears and sun gears are fixed to the crankcase and do not move or rotate with reference to the crankcase.

The term "profiles" or "trajectory/trajectories" means the movement trajectory of a given object in time domain, or the trajectory of a physical value of a given parameter in time domain, or the trajectory in physical space.

The term "constant" in volume actually means the combustion chamber is constrained to keep its variation very small in volume, or the variation of the volume is within a given value (such as <0.2% of its displacement volume Vd or <0.1% of its displacement volume Vd) in a given range of crank angle from x° BTDC to x° ATDC (such as from 14° BTDC to 14° ATDC). It does not mean that the variation of the volume is absolute zero.

In the mechanical or demonstrational drawings, all parts and their related sizes are configured for ease of understanding, not scaled to actually sizes. Teeth sizes and teeth numbers of the gear are not actual sizes in real applications, unless specified in description.

The crankshaft or crankshaft system means the combinations of the main journal, the rod journal, constraining gear and planet gear if there is one. The axle of the main journal is the axle of the crankshaft, or the center of the main journal is the center of the crankshaft. The axle of the rod journal is the axle of the planet gear, or the center of the rod journal is the center of the planet gear, if there is a planet gear mounted on the rod journal.

List of Symbols:

Vp combustion chamber volume when peak cylinder pressure occurs

Vd displacement of the piston

Vc clearance volume of the piston at 0° ATDC a crank angle of the crankshaft, in degrees or radians a1 crank angle of the quasi-arm q a1 is defined as quasi-crank-angle Ax a specific crank angle the constant combustion volume extends to PPP peak combustion pressure or maximum combustion pressure TDC top dead center BDC bottom dead center ATDC after top dead center BTDC before top dead center L length of the connecting rod r distance between the centers of planet gear and main journal m distance between the centers of planet gear and crankpin m is defined as length of crankpin arm mc the critical value of m when combustion chamber volume keeps constant q the distance between the centers of main journal and the crankpin q is defined as quasi-arm, the length of quasi-arm is q FIG. 1 is a section illustration of a prior art crankshaft, which includes a main journal 105, a rod journal 108, the rod journal 108 is rotating around the main journal 105, and the trajectory of the rod journal is circular. The main journal 105 is supported by crankcase 104 via a main journal bearing 106, and the rod journal 108 is connected to the big end 103 of the connecting rod 102. The piston 101 is at its TDC position when crank angle is 0° position. Wherein the big end 103 follows the movement of 108 and has a circular trajectory.

Figure 2:
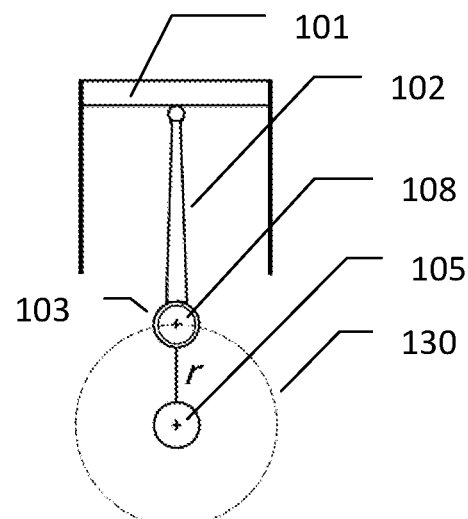
FIG. 2 is an illustration of trajectory of the rod journal of the prior crankshaft.

FIG. 2 is a front view illustration of the trajectory of the prior art crankshaft. The rod journal 108 is rotating around the main journal 105, and the trajectory 130 of the rod journal 108 is circular, the big end 103 of the connecting rod 102 rotates at a circular trajectory 130, too. The piston 101 is at its TDC position when crank angle is 0°. Wherein the big end 103 follows the movement of 108 and has the same circular trajectory 130.

Figure 2A:
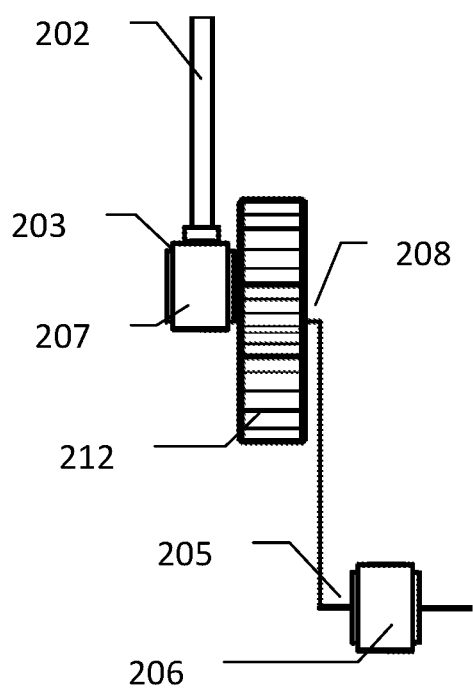
FIG. 2A is a side view illustration of an embodiment of crankshaft system in the present invention.

According to the present invention, a planet gear is added on the rod journal, and a crankpin is mounted on the planet gear, instead of attaching the big end of the connecting rod to the rod journal, the big end of the connecting rod is attached to the crankpin on the planet gear. As shown in FIG. 2A, the big end 203 of the connecting rod 202 is attached to the crankpin 207 mounted on the planet gear 212. When the rod journal 208 rotates around the main journal 205, the planet gear 212 rotates around both the rod journal 208 and the main journal 205. This configuration makes the crankpin 207 rotate in a noncircular trajectory. The big end 203 follows the same trajectory of the crankpin 207. The main journal bearing 206 holds the main journal 205 in its axle position within the crankcase.

Figure 2B:
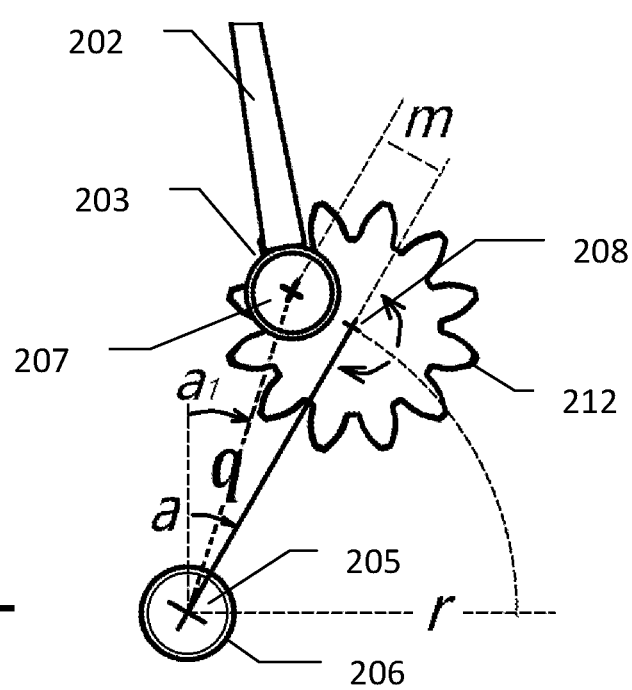
FIG. 2B is a front view illustration of an embodiment of crankshaft system in the present invention.

Referring to FIG. 2B, it is a front view of the novel crankshaft. The planet gear 212 is mounted on the rod journal 208 and can be rotated around the center of the rod journal 208 in clockwise or counterclockwise direction, the big end 203 of the connecting rod 202 is attached to the crankpin 207 which is mounted on the planet gear 212 and can be rotated around the crankpin. Wherein 205 is the main journal, and 206 is the main journal bearing. This configuration makes the crankpin 207 rotate in a noncircular trajectory. Wherein the crank angle of the main journal is defined as a and its reference direction is as shown in FIG. 2B, the distance between the planet gear center to main journal center is r, and the distance between planet gear center and crankpin center is m, the distance between main journal center and the crankpin center is defined as quasi-arm length q, the angle of the crankpin center with reference to the main journal center is defined as quasi-crank-angle a1, or a1is defined as crank angle of the quasi-arm q. The basic configurations or parts relations in FIGS. 2A and 2B are used in the description thereafter. When the planet gear 212 rotates around the rod journal 208 as its axle by different rotations with reference to each rotation of the crankshaft, the crankpin 207 follows a noncircular trajectory, the big end 203 follows the same trajectory of the crankpin 207 and results different combustions of chamber volume and crank angle relations.

For each given connecting rod length L, there are different combinations of r and m. The planet gear 212 rotates around the rod journal 208 in integer k times of rotation with reference to the rotation of the main journal 205, and apparently the said rotation of the main journal is actually the rotation of the crankshaft by definitions above. The result trajectories of the crankpin 207 and the big end 203 are based on selections of L, r, m and k values.

For each combination of given L, r, m and k, there is a specific value m=mc which makes the combustion chamber volume nearly constant from 0° ATDC to x° ATDC, wherein the term "nearly constant" means to keep the volume variation within a given tolerance, for example, within 0.2% of its maximum combustion chamber volume, or 0.1% of its displacement Vd. This constant volume configuration is specifically beneficial to increasing the output torque on the crankshaft. For example, when the peak cylinder pressure takes place at x° ATDC=30° ATDC, the torque on the crankshaft will be multiple times higher than when the same peak cylinder pressure takes place at 5° ATDC.

The following examples show more details of different embodiments of the crankshaft system in the present invention.

Example 1, with a Ring Gear Constraint

A ring gear is used to constrain the rotation of the planet gear, where the ring gear is kept stationary with reference to the crankcase. The shape of the teeth of the planet gear matches with the shape of the teeth of the ring gear, just as it is in an ordinary planetary gear system. The teeth of the planet gear and the ring gear engage firmly in operation. The number of teeth of the ring gear is integer k times of the number of the teeth of the planet gear. When the planet gear rotates around the main journal in an angular velocity, it also rotates at integer k times of the angular velocity around the rod journal.

FIG. 3 is a side section illustration of an embodiment of crankshaft and piston in the present invention with a ring gear 311. Wherein a piston 301 is connected to a connecting rod 302, the connecting rod 302 has a big end 303, the big end 303 is connected to a crankpin 307 and can be rotated around the crankpin freely, when the big end 303 rotates, the piston 301 moves up and down in a cylinder. The crankpin 307 is mounted on a planet gear 312, the planet gear 312 is attached on a rod journal 308 and can be rotated around the rod journal, the rod journal 308 rotates around a main journal 305, where the main journal 305 is supported by the crankcase 304 via a bearing 306. The crankpin 307 rotates around both the main journal 305 and the center of the planet gear 312 at the same time but in different angular velocities because the rotation of the planet gear 312 is constrained by the ring gear 311, the said angular velocities are decided by the teeth numbers of the planet gear and the ring gear. The center of the planet gear 312 is apparently the center of the rod journal 308.

FIG. 4 is a front illustration of the embodiment of crankshaft and piston in the present invention with the ring gear 311. Wherein the piston is 301, the connecting rod is 302, the big end is 303, the main journal is 305, the ring gear 311 has a teeth number of integer k times of the teeth number of the planet gear 312. When the rod journal 308 rotates one circle around the main journal 305, the planet gear 312 rotates k times around the rod journal 308. So that the movement of the crankpin 307 or the big end 303 is a combination of the rotating around the main journal 305 and the rotating around the rod journal 308.

FIG. 4 also shows the rotating trajectory 340 of the big end 303, where the rotating trajectory 330 is of the movement of the rod journal 308. The trajectory 330 is circular and the trajectory 340 is noncircular, wherein the teeth number of the ring gear is 3 times of the teeth number of the planet gear, or k=3. Different k, L, m and r result different profiles in trajectory.

The piston positions, combustion chamber volumes and crank angles are shown in FIG. 5. Wherein the connecting rod is 302, the big end is 303, the planet gear is 312, the ring gear is 311, the combustion chamber volume is 360. The piston is set at its TDC position when the crank angle is a=0°, it is noticeable that the combustion chamber is almost constant from 0° ATDC to 30° ATDC. The TDC position is defined as the top piston position when the connection rod is at up-straight direction as shown in FIG. 4.

Figure 6:
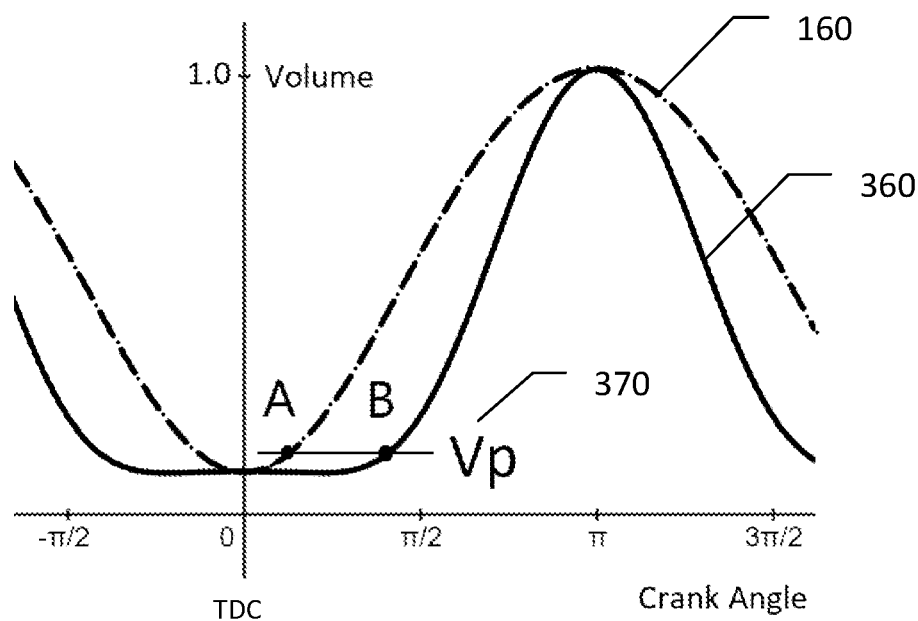
FIG. 6 is a graphic illustration of combustion chamber volumes and crank angles in the present invention with a ring gear and in prior art.

FIG. 6 shows the different combustion chamber volumes between prior art and the embodiment of the invention. Curve 160 is the combustion chamber volume of the prior art, curve 360 is the combustion chamber volume of the invention. Both of them have same clearance volume and same displacement. It is noticeable that point A and point B have same volume Vp 370 but are located at different crank angles. When a same amount of fuel combusts at point A and point B, the cylinder pressure is same because the combustion chamber volumes are same, but the output torques on crankshaft are different because the crank angles are different. The output torque on the crankshaft of the present invention (point B of curve 360) is much higher than the output torque on the crankshaft of the prior art (point A of curve 160) at same cylinder pressure.

At low engine speed in prior art engine, in order to make the peak combustion pressure PPP occur at point A, ignition must be advanced of TDC. At low engine speed in the present invention engine, in order to make the peak combustion pressure PPP occur at point B, ignition can be retarded of TDC because the combustion volume Vp is extended from point A to point B. That is the big difference between two types of crankshaft configuration.

Example 2, with a Sun Gear Constraint

A sun gear is used to constrain the rotation of the planet gear. The sun gear is kept stationary with reference to the crankcase. The shape of the teeth of the planet gear matches with the shape of the teeth of the sun gear, just as it is in an ordinary planetary gear system. The teeth of the sun gear and the planet gear engage firmly in operation. The number of teeth of the sun gear is integer k times of the number of the teeth of the planet gear. When the planet gear rotates around the main journal in an angular velocity, it also rotates at integer k times of the angular velocity around the rod journal.

Figures 7, 8:
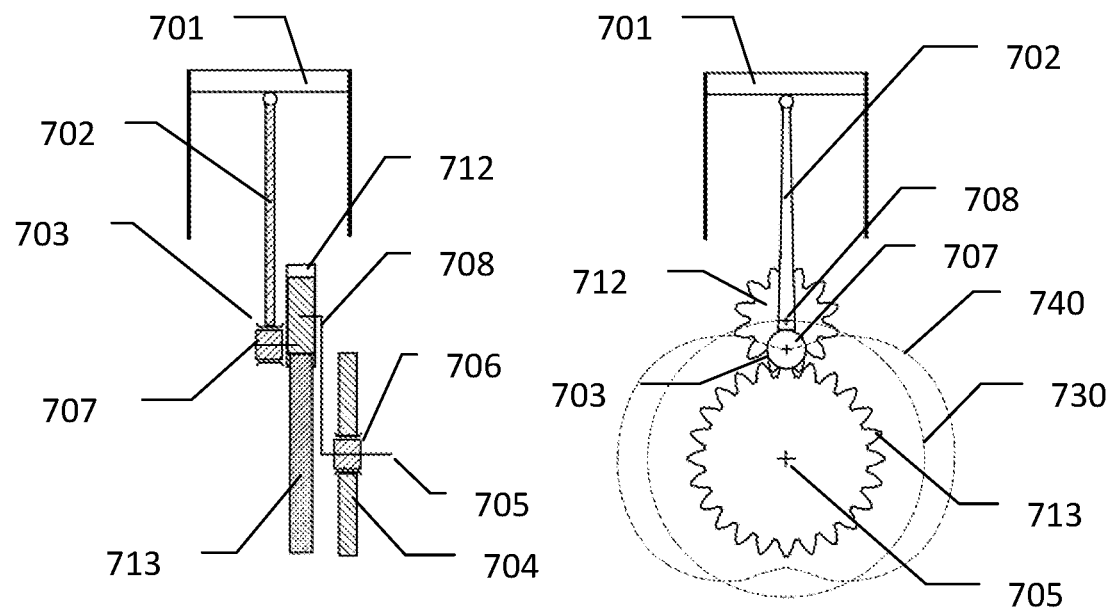
FIG. 7 is a side section illustration of an embodiment of crankshaft and piston in the present invention with a sun gear.
FIG. 8 is a front view illustration of an embodiment of crankshaft and piston in the present invention with a sun gear.

FIG. 7 is a side section illustration of an embodiment of crankshaft and piston in the present invention with a sun gear 713. Wherein a piston 701 is connected to a connecting rod 702, the connecting rod 702 has a big end 703, the big end 703 is connected to a crankpin 707 and can be rotated around the crankpin freely, when the big end 703 rotates, the piston 701 moves up and down in a cylinder. The crankpin 707 is mounted on a planet gear 712, the planet gear 712 is attached or mounted on a rod journal 708 and can be rotated around the rod journal, the rod journal 708 rotates around a main journal 705, where the main journal 705 is supported by the crankcase 704 via a bearing 706. The crankpin 707 rotates around both the main journal 705 and the center of the planet gear 712 at the same time but in different angular velocities because the rotation of the planet gear 712 is constrained by the sun gear 713, the said angular velocities are decided by the teeth numbers of the planet gear and the sun gear. The center of the planet gear 712 is apparently the center of the rod journal 708.

FIG. 8 is a front illustration of the embodiment of crankshaft and piston in the present invention with the sun gear 713. Wherein the piston is 701, the connecting rod is 702, the big end is 703, the main journal is 705, the sun gear 713 has a teeth number of integer k times of the teeth number of the planet gear 712. When the rod journal 708 rotates one circle around the main journal 705, the planet gear 712 rotates k times around the rod journal 708. So that the movement of the crankpin 707 or the big end 703 is a combination of the rotating around the main journal 705 and the rotating around the rod journal 708.

FIG. 8 also shows the rotating trajectory 740 of the big end 703, where the rotating trajectory 730 is of the movement of the rod journal 708. The trajectory 730 is circular and the trajectory 740 is noncircular, wherein the teeth number of the sun gear is 2 times of the teeth number of the planet gear, or k=2. Different k, L, m and r result different profiles in trajectory.

Figure 9:
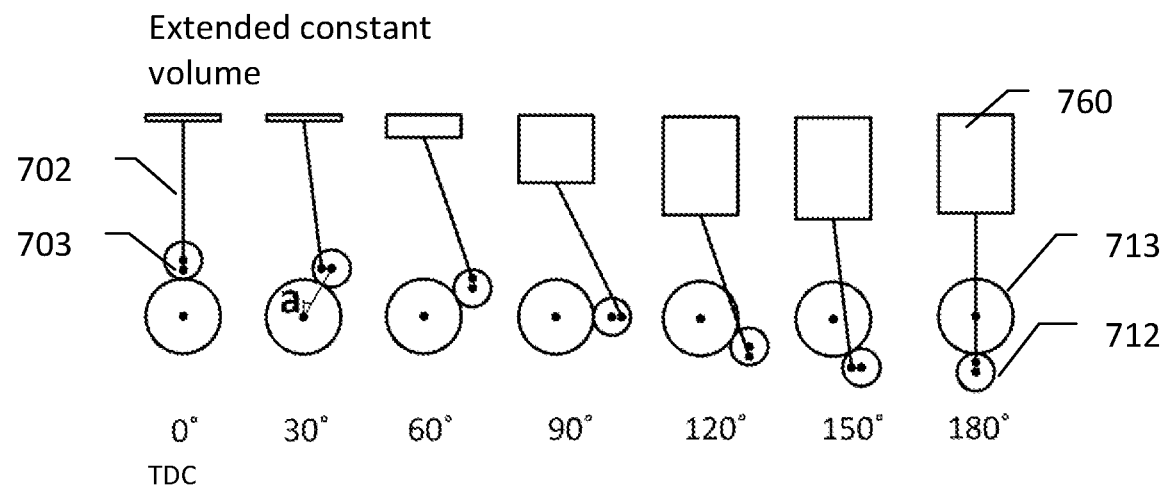
FIG. 9 is an illustration of piston positions, combustion chamber volumes and crank angles in the present invention with a sun gear.

The piston positions, combustion chamber volumes and crank angles are shown in FIG. 9. Wherein the connecting rod is 702, the big end is 703, the planet gear is 712, the sun gear is 713, the combustion chamber volume is 760. The piston is at its TDC position when the crank angle is 0°. It is noticeable that the combustion chamber is almost constant from 0° ATDC to 30° ATDC. The TDC position is defined as the top piston position when the connection rod is at up-straight direction as shown in FIG. 8.

Figure 10:
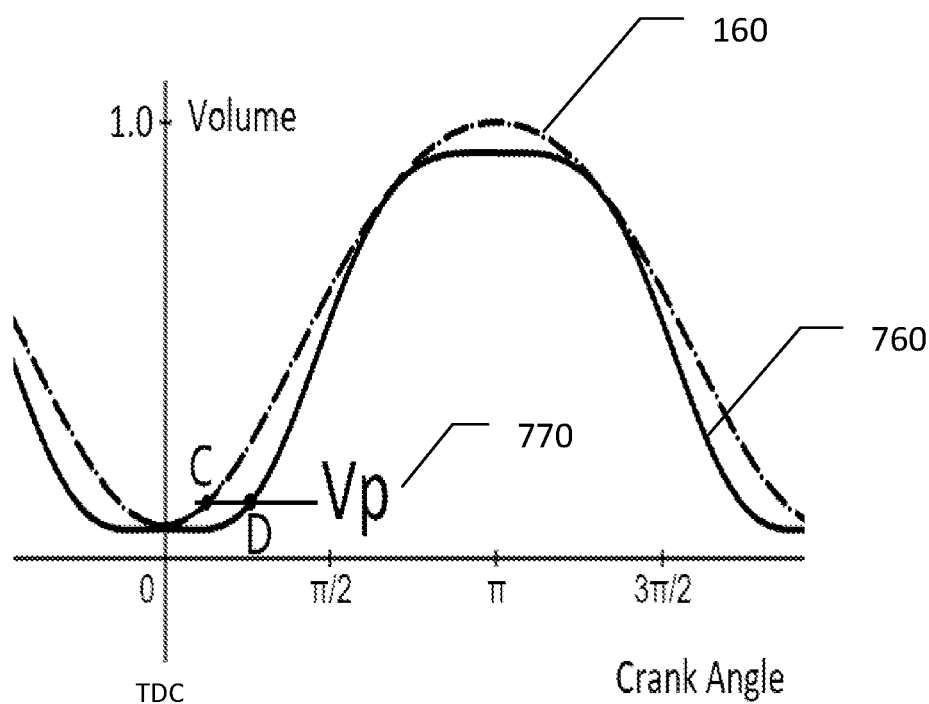
FIG. 10 is a graphic illustration of combustion chamber volumes and crank angles in the present invention with a sun gear and in prior art.

FIG. 10 shows the different combustion chamber volumes between prior art and the embodiment the invention. Curve 160 is the combustion chamber volume of the prior art, curve 760 is the combustion chamber volume of the invention. Both of them have same L, same clearance volume and almost same displacement. It is noticeable that point C and point D have same volume Vp 770 but are located at different crank angles. When a same amount of fuel combusts at point C and point D, the cylinder pressures are same because the combustion chamber volumes are same, but the output torques on crankshaft are different because the crank angles are different. The output torque on the crankshaft of the present invention (point D of curve 760) is much higher than the output torque on the crankshaft of the prior art (point C of curve 160).

At low engine speed in prior art engine, in order to make the peak combustion pressure PPP occur at point C, ignition must be advanced of TDC. At low engine speed in the present invention engine, in order to make the peak combustion pressure PPP occur at point D, ignition can be retarded of TDC because the combustion volume Vp is extended from point C to point D. That is the essential difference between two types of crankshaft configurations.

Figure 11:
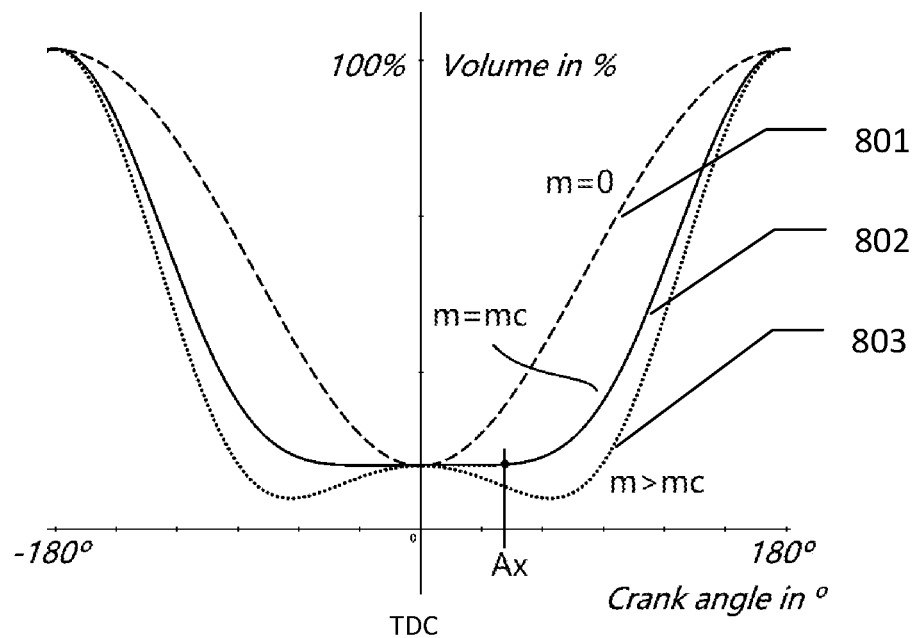
FIG. 11 is a comparison of the results of different m configurations of the embodiments in the present invention.

Different configurations of m sizes result different combustion chamber volume trajectories. FIG. 11 shows three configurations of m when k=3 with a ring gear constraint, where m is the length of the crankpin arm as defined above. The curve 801 is corresponding to m=0, where the combustion chamber volume is the same as that of a conventional piston. The curve 802 is corresponding to the critical value m=mc, where the combustion chamber volume keeps almost constant from TDC to 40° ATDC, in other words, the combustion chamber volume changes in less than 0.2% of its displacement volume Vd from TDC to 40° ATDC, or defined as Ax=40° ATDC. The curve 803 is corresponding to m>mc, where the minimum combustion chamber volume is shifted from TDC position to position >60° ATDC and position <60° BTDC in reference to the conventional piston. There is only one critical mc at a given set of k, L, r and Rp of a specific piston.

Similar combustion chamber volume vs crankpin arm length m relations keep true in a sun gear constrained crankshaft, but the Ax is smaller at same given gear ratio k.

Figure 11A:
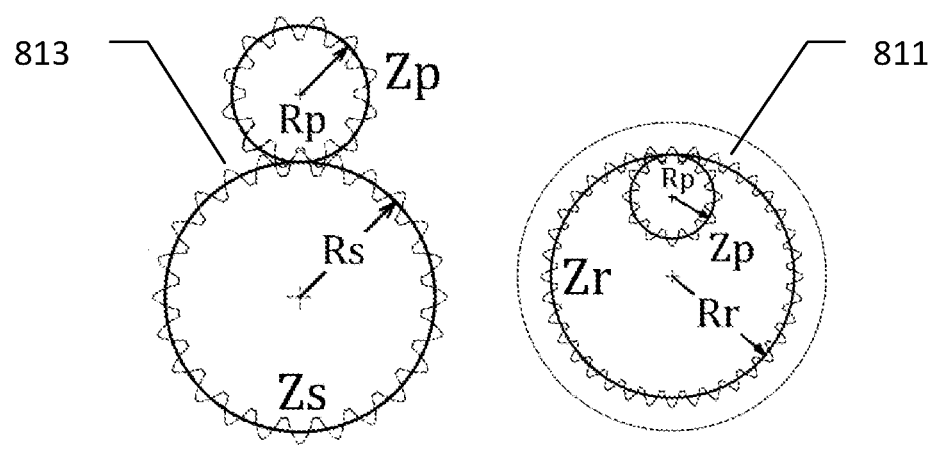
FIG. 11A is the Zp, Zr, Zs, Rp, Rr, Rs definition of the embodiments in the present invention.

The definition of the Zp, Zr, Rp, Rr, in ring gear configurations is shown in 811 of FIG. 11A, k=Zr/Zp=Rr/Rp, wherein Zr is the number of teeth of the ring gear, Zp is the number of teeth of the planet gear, Rr is the equivalent radius of the ring gear, Rp is the equivalent radius of the planet gear.

The definition of the Zp, Zs, Rp, Rs in sun gear configurations is shown in 813 of FIG. 11A, k=Zs/Zp=Rs/Rp, wherein Zs is the number of teeth of the sun gear, Zp is the number of teeth of the planet gear, Rs is the equivalent radius of the sun gear, Rp is the equivalent radius of the planet gear.

There are provided more configurations and more results. FIG. 12 shows some example of these preferable configurations when the variation of the combustion chamber volume is within 0.2% of its corresponding Vd.

For the combination of a ring gear and a planet gear, the trajectories of the crankpin or big end is shown in 820. Wherein k is the teeth number of the ring gear divided by the teeth number of the planet gear, k is integer, L is the length of the connecting rod, r is the distance between planet gear center to the main journal center, m is the distance between crankpin center to the rod journal center, and wherein m=mc.

As shown in 820, L=4, when k=3, the constant volume extends to Ax>40° ATDC, when k=4, the constant volume extends to Ax>22° ATDC, when k=5, the constant volume extends to Ax>15° ATDC. For each k, the corresponding mc value is different.

For the combination of a sun gear and a planet gear, the trajectories of the crankpin or big end is shown in 821. Wherein k is the teeth number of the sun gear divided by the teeth number of the planet gear, k is integer, L is the length of the connecting rod, r is the distance between planet gear center to the main journal center, m is the distance between crankpin center to the rod journal center, and where m=mc.

As shown in 821, L=4, when k=1, the constant volume extends to Ax>25° ATDC, when k=2, the constant volume extends to Ax>18° ATDC, when k=3, the constant volume extends to Ax>14° ATDC. For each k, the corresponding mc value is different.

Different combinations of the gears, k, L, r and m result different combustion chamber volume trajectories. These examples in FIG. 12 are only some of the preferable configurations.

When k is not an integer, the cycloid, trochoid, hypocycloid or epicycloids gear mechanisms do not always result practically useful torques despite of the fact that constant combustion chamber volumes can be obtained. One example is shown in FIG. 12A.

FIG. 12A shows the torque/ combustion chamber volume in Andre's square engine, where k=4/3, the ring gear has 32 teeth and the planet gear has 24 teeth. When L=1.38 and m=0.75, r=0.25, the combustion volume keeps almost constant from a 2π to 4π, but this does not contribute any positive torque on the crankshaft. Because the torque direction is opposed to the rotation of the crankshaft, no positive torque is generated in this configuration. The combustion chamber volume is shown as 830 of FIG. 12A, and torque on crankshaft is shown as 831 of FIG. 12A. The torque is negative when the combustion chamber is in its expansion stroke.

It is to be noticed that in ring gear and planet gear configuration, when k is with a fraction such as 5/3, 5/4, 4/3, 3/2, etc., a constant combustion chamber volume can be possibly obtained but the output torque on crankshaft may be distorted (or it is not always positive). The torque on the crankshaft is useful only when the torque has the same frequency and at the same direction (or phase) with reference to the rotation of the crankshaft. And when k=2, the minimum volume is located at TDC position and constant combustion chamber volume extension is too small to be useful in practically applications. And when k>5, the constant combustion chamber volume extension is too small to be useful in practically applications, or the angular velocity of the planet gear may be too big to be handled in real application.

It is to be noticed that in sun gear and planet gear configuration, when k is with a fraction such as 5/3, 5/4, 4/3, 3/2, etc., a constant combustion chamber volume can be obtained but the output torque on crankshaft may be distorted (or it is not always positive). The torque on the crankshaft is useful only when the torque has the same frequency and the same direction (phase) with reference to the rotation of the crankshaft. And when k>4, the constant combustion chamber volume extension is too small to be useful in practically applications, or the angular velocity of the planet gear may be too big to be handled in real application.

The mathematical expressions of the relations of V, L, r, q, m, a, a1 and Vc are shown in FIG. 13. Wherein Vc is the clearance volume at 0° TDC position. a is the angle of crankshaft as defined above, and a1 is defined as quasi-crank-angle or the angle of the quasi-arm q. The ring gear and planet gear configuration is shown as 890, the sun gear and planet gear configuration is shown as 891.

Based on the equations of FIG. 13, many more combinations of k, L, r, m, Vc can be derived to obtain may preferable (or constant) combustion chamber volumes or trajectories in different applications.

FIG. 14 is a list of some examples of k, L, m and Ax relations, wherein the variations of combustion volumes V are within 0.2% of displacement of the piston Vd at given constraints, and Vc=0.2, combustion chamber volume is expressed as V. Wherein k=integer, and m=mc. It is understandable the different m and Ax corresponding to different k, L, and results are not limited to the configurations of these examples.

Figure 15:
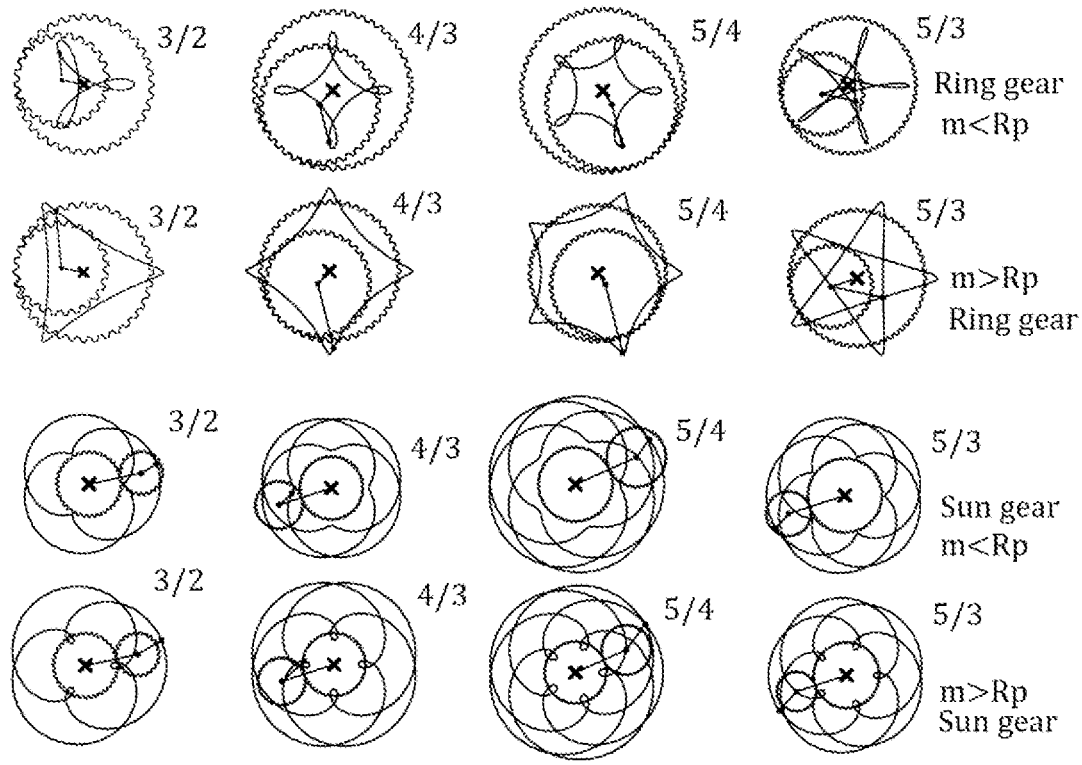
FIG. 15 is a list some trajectories of crankpins wherein k is not an integer.

FIG. 15 is a list of some trajectories when k is not an integer, both m<Rp and m>Rp are, and k=3/2, 4/3/ 5/4, 5/3. When k is not an integer, no constant combustion volume and positive torque can be obtained at same time. Where the orientations of the trajectories of the ring/planet gear or the sun/planet gear are not aligned with the zero position as described or defined above. FIG. 15 is just for universal demonstration without specific orientation. In the graphics of FIG. 15, in each ring and planet configuration, the bigger circle presents ring gear, the smaller circle presents planet gear; and in each sun and planet configuration, the bigger circle presents sun gear, the smaller circle presents planet gear.

Figure 16:
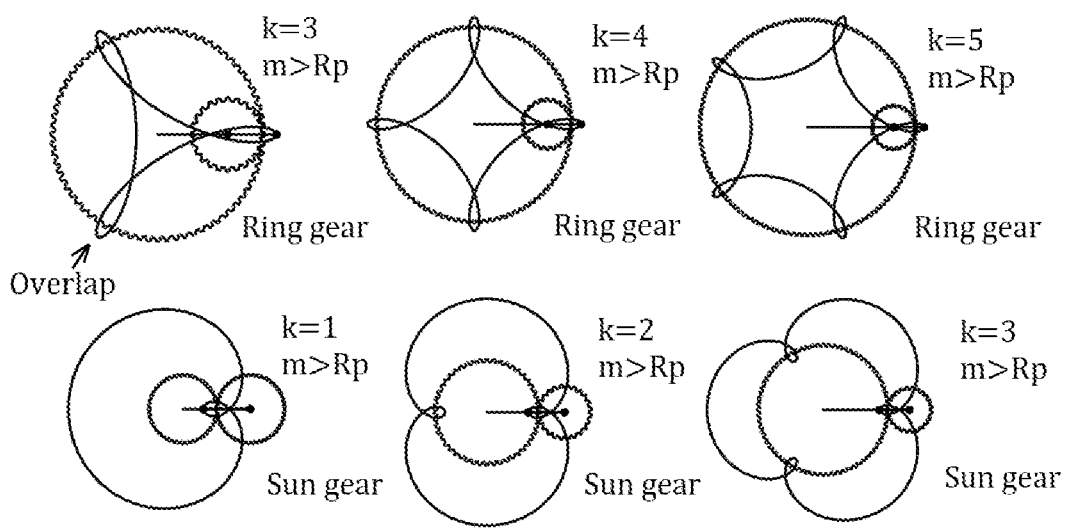
FIG. 16 is a list some trajectories when k=integer but m>Rp, wherein the trajectories are overlapped near the position of the minimum combustion chamber volume.

FIG. 16 is a list some trajectories when k=integer 3, 4, 5 with ring gear constraints, and k=integer 1, 2, 3 with sun gear constraints, and m>Rp, wherein the trajectories are overlapped near minimum combustion chamber volume position. When the crankpin arm length m is bigger than the equivalent radius of the planet gear, excessive pumping losses or piston wears will occur because the piston may up and down more than two times near minimum volume position(s) in a complete working circle. In the graphics of FIG. 16, in each ring and planet configuration, the bigger circle presents ring gear, the smaller circle presents planet gear; and in each sun and planet configuration, the bigger circle presents sun gear, the smaller circle presents planet gear. Wherein FIG. 16, the orientations of the trajectories of the ring/planet gear or the sun/planet gear are for demonstration only and are not aligned with the zero position as described or defined in FIG. 12.

Referring back to FIG. 12, when m<Rp, preferable constant minimum combustion chamber volume can be obtained in real applications. Referring to FIG. 16, the trajectories are overlapped near minimum combustion chamber volume position when m>Rp, the overlap means more pumping movements, more losses and wears near minimum volume position.

Again referring to FIG. 12, when k is even, (for example, k=2, 4, 6, 8 etc.), in some L, r, m configurations, piston may has more pumping movements near maximum combustion chamber volume positions (or near BDC position), in other words, the piston may move up and down more than two times near maximum combustion chamber volume positions (or BDC position) in each working circle.

Again referring to FIG. 12, when k is odd, (for example, k=1, 3, 5, 7 etc.), piston has less pumping movement near maximum combustion chamber volume position because the piston moves up and down only two times near maximum combustion chamber volume position in each working circle.

More generally, whenever the crankpin trajectory shows an overlap, regardless the value of k, the piston has more pumping movements and losses near one or more positions because the piston moves up and down more than two times near this/these position(s) in each working circle. Some graphics are shown in FIG. 15 and FIG. 16.

More generally, whenever the k is not an integer, the piston cannot make an extended minimum combustion chamber volume and a positive torque on crankshaft at the same time. Some graphics are shown in FIG. 15.

The invention claimed is:

1. A crankshaft system of piston engine, comprising:
a main journal,
a rod journal,
a ring gear with a equivalent radius Rr and a total of Zr teeth,
a planet gear with a equivalent radius Rp and a total of Zp teeth,
a crankpin,
a connecting rod,
wherein the rod journal rotates around the main journal, the distance between the rod journal center and the main journal center is r, the planet gear rotates around the rod journal, and the rotation of the planet gear is inside of the ring gear and is constrained by the ring gear, the crankpin is mounted on the planet gear, the distance between the planet gear center and the crankpin center is m, the length of the connecting rod is L, a first end of the connecting rod is attached to the crankpin, a second end of the connecting is attached to a piston,
wherein the main journal is fixed on a crankcase by a bearing and the main journal rotates in the bearing around its axle,
wherein the ring gear is stationary with reference to the crankcase,
wherein 0<m<r<L, m<Rp, k=Zr/Zp=Rr/Rp, k is integer 3, 4 or 5, Zr and Zp are integers,
wherein when the piston is at its TDC position, all 4 restrictions are applied at same time:
Restriction 1, crank angle=0;
Restriction 2, the center of planet gear, the center of the ring gear and the center of the crankpin are aligned with the connecting rod;
Restriction 3, the rod journal is at its uppermost position;
Restriction 4, the center of the crankpin is at the lower side of the planet gear center,
wherein the piston and a cylinder define a combustion chamber volume, the maximum combustion chamber volume defines a displacement of the piston, the combustion chamber volume when the piston is at its TDC position defines a minimum volume. The variation of the combustion chamber volume is within 0.2% of the displacement of the piston from 0° ATDC to Ax=15° ATDC and beyond.

2. The crankshaft system of piston engine of claim 1:
wherein k=3, the variation of the combustion chamber volume is within 0.2% of the displacement of the piston from 0° ATDC to Ax=40° ATDC, and peak combustion pressure PPP is located after Ax=40° ATDC.

3. The crankshaft system of piston engine of claim 1:
wherein k=4, the variation of the combustion chamber volume is within 0.2% of the displacement of the piston from 0° ATDC to Ax=22° ATDC, and peak combustion pressure PPP is located after Ax=22° ATDC.

4. The crankshaft system of piston engine of claim 1:
wherein k=5, the variation of the combustion chamber volume is within 0.2% of the displacement of the piston from 0° ATDC to Ax=15° ATDC, and peak combustion pressure PPP is located after Ax=15° ATDC.

5. The crankshaft system of piston engine of claim 1:
wherein an ignition of combustion is initiated after the piston passes the TDC position and before the Ax° (ATDC) position by retarded ignition.

6. A crankshaft system of piston engine, comprising:
a main journal,
a rod journal,
a sun gear with a equivalent radius Rs and a total of Zs teeth,
a planet gear with a equivalent radius Rp and a total of Zp teeth,
a crankpin,
a connecting rod,
wherein the rod journal rotates around the main journal, the distance between the rod journal center and the main journal center is r, the planet gear rotates around the rod journal, and the rotation of the planet gear is outside of the sun gear and is constrained by the sun gear, the crankpin is mounted on the planet gear, the distance between the planet gear center and the crankpin center is m, the length of the connecting rod is L, a first end of the connecting rod is attached to the crankpin, a second end of the connecting is attached to a piston,
wherein the main journal is fixed on a crankcase by a bearing and the main journal rotates in the bearing around its axle,
wherein the sun gear is stationary with reference to the crankcase,
wherein 0<m<r<L, m<Rp, k=Zs/Zp=Rs/Rp, k is integer 1, 2 or 3, Zs and Zp are integers,
wherein when the piston is at its TDC position, all 4 restrictions are applied at same time:
Restriction 1, crank angle=0;
Restriction 2, the center of planet gear, the center of the sun gear and the center of the crankpin are aligned with the connecting rod;
Restriction 3, the rod journal is at its uppermost position;
Restriction 4, the center of the crankpin is at the lower side of the planet gear center,
wherein the piston and a cylinder define a combustion chamber volume, the maximum combustion chamber volume defines a displacement of the piston, the combustion chamber volume when the piston is at its TDC position defines a minimum volume. The variation of the combustion chamber volume is within 0.2% of the displacement of the piston from 0° ATDC to Ax=14° ATDC and beyond.

7. The crankshaft system of piston engine of claim 6:
wherein k=1, The variation of the combustion chamber volume is within 0.2% of the displacement of the piston from 0° ATDC to Ax=25° ATDC, and peak combustion pressure PPP is located after Ax=25° ATDC.

8. The crankshaft system of piston engine of claim 6:
wherein k=2, The variation of the combustion chamber volume is within 0.2% of the displacement of the piston from 0° ATDC to Ax=18° ATDC, and peak combustion pressure PPP is located after Ax=18° ATDC.

9. The crankshaft system of piston engine of claim 6:
wherein k=3, The variation of the combustion chamber volume is within 0.2% of the displacement of the piston from 0° ATDC to Ax=14° ATDC, and peak combustion pressure PPP is located after Ax=14° ATDC.

10. The crankshaft system of piston engine of claim 6:
wherein an ignition of combustion is initiated after the piston passes the TDC position and before Ax° (ATDC) position by retarded ignition.

11. A method of extending the minimum combustion chamber volume of a piston engine, comprising:
a main journal,
a rod journal,
a constraining gear,
a planet gear,
a crankpin,
a connecting rod,
wherein the rod journal rotates around the main journal, the distance between the rod journal center and the main journal center is r, the planet gear rotates around the rod journal, the rotation of the planet gear is constrained by the constraining gear, the crankpin is mounted on the planet gear, the distance between the planet gear center and the crankpin center is m, the length of the connecting rod is L, a first end of the connecting rod is attached to the crankpin, a second end of the connecting is attached to a piston,
wherein the main journal is fixed on a crankcase by a bearing and the main journal rotates in the bearing around its axle,
wherein the constraining gear is stationary with reference to the crankcase,
wherein the piston and a cylinder define a combustion chamber volume, the maximum combustion chamber volume defines a displacement, the combustion chamber volume when the piston is at its TDC position defines a minimum volume,
wherein the number of teeth of the constraining gear is integer k times of the number of teeth of the planet gear, k=1, 2, 3, 4 or 5,
wherein 0<m<r<L,
wherein when the piston is at its TDC position, all 4 restrictions are applied at same time:
Restriction 1, crank angle=0;
Restriction 2, the center of planet gear, the center of the sun gear and the center of the crankpin are aligned with the connecting rod;
Restriction 3, the rod journal is at its uppermost position;
Restriction 4, the center of the crankpin is at the lower side of the planet gear center,
wherein when the main journal rotates, the crankpin rotates around both the main journal and the planet gear center simultaneously but in different angular velocities, the trajectory of the crankpin is noncircular, the movement the first end of the connecting rod follows the trajectory of the crankpin. The variation of the combustion chamber volume is within 0.2% of the displacement of the piston from 0° ATDC to Ax=14° ATDC and beyond, this combustion chamber volume is referred to as an extended minimum combustion chamber volume from 0° ATDC to Ax=14° ATDC and beyond.

12. The method of extending the minimum combustion chamber volume of claim 11:

wherein the constraining gear is a ring gear, the planet gear is placed inside of the ring gear, the teeth of the planet gear engage with the teeth of the ring gear in operation, wherein the movement of the crankpin center is noncircular, the movement the first end of the connecting rod follows the trajectory of the crankpin, wherein the variation of the combustion chamber volume is within 0.2% of the displacement of the piston from 0° ATDC to Ax=15° ATDC, the minimum volume extends from TDC to Ax and beyond.

13. The method of extending the minimum combustion chamber volume of claim 11:

wherein the constraining gear is a sun gear, the planet gear is placed outside of the sun gear, the teeth of the planet gear engage with the teeth of the sun gear in operation, wherein the variation of the combustion chamber volume is within 0.2% of the displacement of the piston from 0° ATDC to Ax=14° ATDC, the minimum volume extends from TDC to Ax and beyond.

14. The method of extending the minimum combustion chamber volume of claim 11:

Wherein the constraining gear is a ring gear, the planet gear rotates inside of the ring gear, the mathematical relations of the extended minimum volume follows the expressions:

$$V=(L+r+Vc-m)-(L*\cos(\arcsin((q/L)*\sin(a1)))+q*\cos(a1)),$$

where in $a1=a+\arcsin((m/q)*\sin(k*a))$, wherein $q=$square root $(\text{square}(m)+\text{square}(r)-2*m*r*\cos(k*a))$, wherein a is the crank angle of the crankshaft, wherein Vc is the minimum volume at TDC position, There is a critical m=mc at each given set of L, r and k under the constraining conditions, a specific Ax can be obtained, where the variation of the combustion chamber volume V keeps within 0.2% of the displacement of the piston from 0° ATDC to Ax° ATDC, wherein Ax>15.

15. The method of extending the minimum combustion chamber volume of claim 11:

Wherein the constraining gear is a sun gear, the planet gear rotates outside of the sun gear, the mathematical relations of the extended minimum volume follows the expressions:

$$V=(L+r+Vc-m)-(L*\cos(\arcsin((q/L)*\sin(a1)))+q*\cos(a1)),$$

where in $a1=a-\arcsin((m/q)*\sin(k*a))$, wherein $q=$square root $(\text{square}(m)+\text{square}(r)-2*m*r*\cos(k*a))$, wherein a is the crank angle of the crankshaft, wherein Vc is the clearance minimum volume at TDC position, There is a critical m=mc at each given set of L, r and k under the constraining conditions, a specific Ax can be obtained, where the variation of the combustion chamber volume V keeps within 0.2% of the displacement of the piston from 0° ATDC to Ax° ATDC, wherein Ax>14.

16. The method of extending the minimum combustion chamber volume of claim 11:

wherein an ignition of combustion is initiated after the piston passes the TDC position and before Ax° (ATDC) position by retarded ignition.

17. The method of extending the minimum combustion chamber volume of claim 14:

Peak combustion pressure PPP is located after Ax° ATDC by retarded ignition.

18. The method of extending the minimum combustion chamber volume of claim 15:

Peak combustion pressure PPP is located after Ax° ATDC by retarded ignition.

* * * * *